United States Patent [19]
Fujita

[11] Patent Number: 5,111,446
[45] Date of Patent: May 5, 1992

[54] DISK CARTRIDGE AND DISK DRIVE

[75] Inventor: Minoru Fujita, Toride, Japan

[73] Assignee: Hitachi Maxell, Ltd., Osaka, Japan

[21] Appl. No.: 319,669

[22] Filed: Mar. 7, 1989

[30] Foreign Application Priority Data

Mar. 8, 1988 [JP] Japan .................................. 63-52557

[51] Int. Cl.$^5$ .................... G11B 7/26; G11B 23/03; G11B 23/00
[52] U.S. Cl. .................................. 369/291; 369/261; 360/133
[58] Field of Search ............... 369/282, 287, 261, 290, 369/291, 280; 360/133; 206/309, 312, 444

[56] References Cited

U.S. PATENT DOCUMENTS

| | | | |
|---|---|---|---|
| Re. 32,781 | 11/1988 | Takahashi | 360/133 |
| 3,768,815 | 10/1973 | Mathurin | 369/261 |
| 4,408,318 | 10/1983 | Sugiura | 369/261 |
| 4,466,031 | 8/1984 | Muraoka | 360/133 X |
| 4,471,397 | 9/1984 | Cloutier | 360/133 |
| 4,544,977 | 10/1985 | Ozawa et al. | 360/133 |
| 4,639,813 | 2/1987 | Uno | 360/133 X |
| 4,694,448 | 9/1987 | Tamaru et al. | 360/133 X |
| 4,705,279 | 11/1987 | Mizukami et al. | 369/261 X |
| 4,743,994 | 5/1988 | Kato et al. | 360/133 |

Primary Examiner—Benjamin R. Fuller
Assistant Examiner—Randy W. Gibson
Attorney, Agent, or Firm—Birch, Stewart, Kolasch & Birch

[57] ABSTRACT

A disk cartridge and drive assembly including a disk cartridge having a case assembly rotatively accommodating therein a disk including a metallic center hub having a center hole therethrough, the case assembly being formed by an upper case without a center opening and a lower case having a center opening therein, the disk cartridge comprising: a projection protruding from an inner surface of the upper case and capable of being freely inserted through the center hole of the center hub, and a disk drive capable of rotating at least a disk accommodated in the case assembly and having a metallic center hub, the disk drive comprising a rotatable portion including a magnet for attracting the center hub which appears in the center opening formed in the case assembly, a drive pin to be inserted into a drive hole formed in the center hub, and a flat portion on which the center hub is mounted, this flat portion having an annular groove formed therein creating an outer flat portion having a flat surface and an inner flat portion having a flat surface, and a clamp member disposed for engaging the marginal portion around the center hole of a disk mounted on and supported by the outer flat surface of the outer flat portion surrounding the annular groove when a disk, accommodated in a flexible jacket and having no center hub, is used, and is arranged to come into close contact with the outer flat portion and with the side outer surface of the annular groove and the marginal surface around the center hole in the disk.

11 Claims, 5 Drawing Sheets

DISK CARTRIDGE AND DISK DRIVE

BACKGROUND OF THE INVENTION

1. Field of the Invention

The present invention relates to a disk cartridge and a disk drive, and, more particularly, to a magnetic disk cartridge which accommodates a flexible magnetic disk having a metallic center hub within a plastic thin case. The present invention further relates to a disk drive preferable at least for driving the flexible magnetic disk of the stated magnetic disk cartridge.

2. Description of the Related Art

A flexible magnetic disk, called a "floppy disk", can be classified into two types, at present, a flexible magnetic disk accommodated in a flexible jacket; and a disk cartridge type magnetic disk accommodated in a thin and relatively rigid case.

The magnetic disk of the former type is provided with no center hub so that the magnetic disk is rotated by being held at a portion around a center hole thereof between a hollow end of a spindle member and a vertically-movable clamp member of a disk drive. Therefore, the accuracy in centering the magnetic disk can be, in principle, determined by the accuracy in machining the center hole in the disk and an expansion/contraction of the disk caused by temperature and humidity. However, this accuracy in machining the center hole involves a certain restriction to be improved because this magnetic disk needs to be smoothly loaded/unloaded. On the other hand, the centering accuracy due to the expansion caused from the changes in temperature and humidity can be, to a certain extent, compensated by the temperature and humidity correction in the disk drive. However, in a case where the magnetic disk is cut out from a web-like recording medium, the anistropy in expansion/contraction of the recording medium remains, i.e. The degree of expansion/contraction of the recording medium in the direction along which the film has been wound is different from that in the widthwise direction of the same. Therefore, a problem arises that the deformation of the track of the magnetic disk cannot be prevented simply by the temperature and humidity correction or compensation features in the disk drive.

On the other hand, the latter disk cartridge type magnetic disk is provided with a hard center hub for chucking. Although various type of center hubs for various type of chucking have been proposed, the metal plate type are predominant at present, most of which utilize magnetic attraction and a drive pin as a driving system. In the magnetic disk having such a center hub, dimensional accuracy of the inner diameter of the hub is not required to be very high. Therefore, it can be subjected to a heat treatment for the purpose of correcting the distortion or strain thereof. For example, in a case of a magnetic disk derived from a base film made from polyethylene-terephthalate, the anistropic expansion/contraction of the disk can be reduced to one-third by punching it into a disc-like form and then leaving it at an ambient temperature of 80° C. Therefore, the deformation of the track after assembly can be considerably reduced.

Figure 9A:
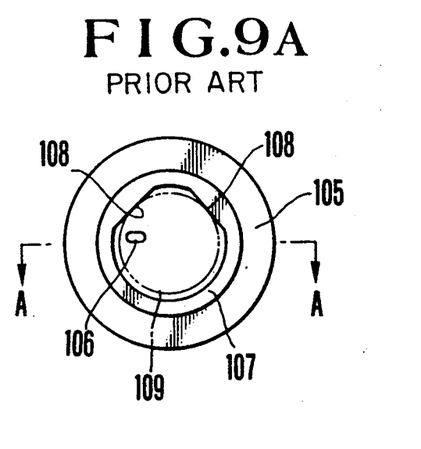
FIG. 9A is an explanatory view which illustrates a rear side of a center hub.
Figure 9B:
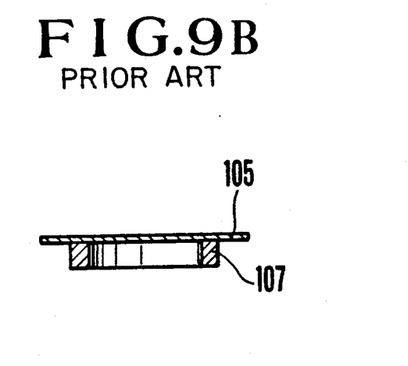
FIG. 9B is a cross-sectional view taken along line A—A in FIG. 9A.
Figure 10:
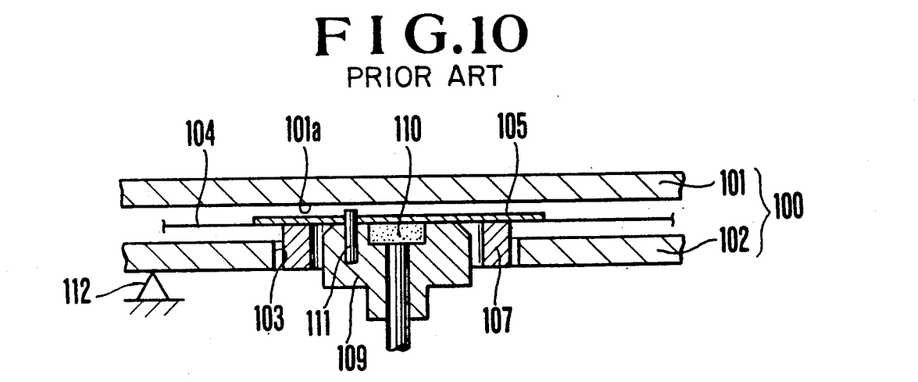
FIG. 10 is a cross-sectional view which illustrates an essential portion of the conventional disk cartridge loaded to a magnetic disk drive.

FIGS. 9 and 10 respectively illustrate an essential part of a magnetic disk having a metallic center hub and the essential part of a magnetic disk drive.

Referring to the drawings, a thin plastic case assembly 100 comprises an upper case 101 and a lower case 102. The lower case 102 has a center opening 103. A flexible magnetic disk 104 is arranged in such a manner that the marginal portion around the center opening 103 is secured to a metallic center hub 105. The disk 104 is freely rotatably accommodated in the case assembly 100. The center hub 105 has a drive hole 106, and a lower surface thereof to which an annular projection 107 is secured, the annular projection 107 including straight portions 108 in the inner surface thereof.

The magnetic disk drive is provided with a spindle member (rotary driving member) 109 for chucking and rotating the center hub 105. The spindle member 109 has a magnet 110 to attract and hold the rear side of the center hub 105. In addition, a drive pin 111 is inserted into and engaged with the drive hole 106. Furthermore, the outer surface of the spindle member 109 is engaged with the inner surface of the annular projection 107, as shown by an imaginary line in FIG. 9A, so that the spindle member 109 can correctly position the center hub 105 during rotational drive of the magnetic disk 104.

In the above-described structure, when the magnetic disk cartridge is loaded on the disk drive, the lower case 102 of the case assembly 100 is positioned by a support member 112 so that a predetermined gap can be left between the center hub 105 chucked by the spindle member 109 and the inner surface 101a of the upper case 101. However, if the case assembly 100 is deformed, the top portion of the drive pin 111 may be brought into contact with the inner surface 101a of the upper case 101, causing smooth rotation of the magnetic disk 104 to be prevented or disturbed.

Figure 11:
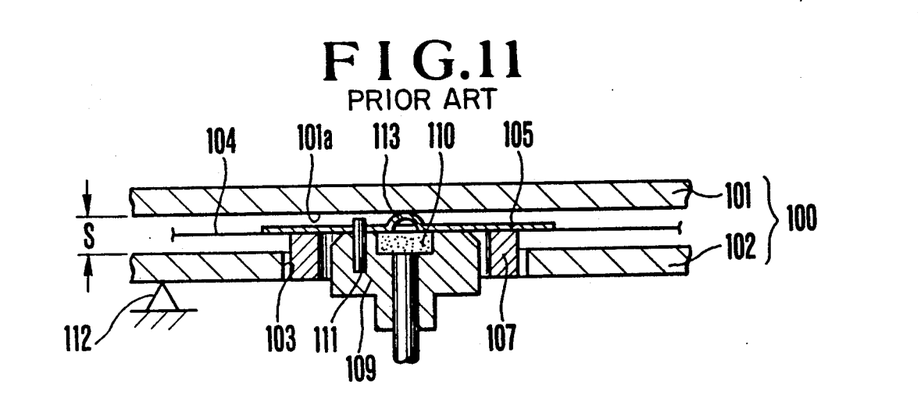
FIG. 11 is a cross-sectional view illustrating a second conventional example.

Therefore, an attempt has been made, as shown in FIG. 11, to provide a projection 113, which can be brought into contact with the inner surface 101a of the upper case 101 in the central portion of the center hub 105, for the purpose of preventing the drive pin 111 from being brought into contact with the upper case 101, even if the case assembly 100 deforms.

However, if the upper case 101 is warped or curved inward in the structure shown in FIG. 11, the projection 113 will always contact the inner surface 101a of the upper case 101. This contact will serve as a load against rotation, and causes the upper case 101 to be abraded, resulting in the generation of abrasion dust. In addition, there is the fear that the forced contact pressure between the center hub 105 and the end surface of the spindle 109 will becomes too high to allow the appropriate centering of the disk 104 with respect to the spindle 109. Furthermore, because the height of the projection 113 should be made higher than the drive pin 111 by a certain degree, the inner thickness S of the case assembly 100 can not be sufficiently reduced, i.e. the case assembly 100 can not be made thin to the degree desired.

On the other hand, the disk drive for the disk cartridge is provided with only the center hub chucking function, and is not arranged to drive the magnetic disk accommodated in the jacket, without the center hub 105.

SUMMARY OF THE INVENTION

Under the circumstances, the present invention has been developed to overcome the problems experienced with the conventional technology.

It is therefore, an object of the present invention is to provide a disk cartridge in which there is no fear that the drive pin or the like will be brought into contact with the upper case, that the upper case is abraded, or that error in the centering will occur, even if the inner thickness of the case is reduced to be relatively small.

It is a further object of the present invention is to provide a disk drive which is capable of selectively chucking and driving either one of two types of disks, one type having a center hub and accommodated in a disk cartridge case, and another type being accommodated in a jacket and having no center hub.

The above-described object can be achieved by a disk cartridge according to the invention, having a case assembly rotatably accommodating therein a disk including a metallic center hub having a center hole therethrough, the case assembly being formed by an upper case without a center opening and a lower case having a center opening therein, the disk cartridge comprising a projection protruding from an inner surface of the upper case and capable of being freely inserted through the center hole.

Furthermore, in order to achieve the above-described object, a disk drive which is capable of rotating at least a disk accommodated in a case and having a metallic center hub is provided, the disk drive comprising a rotating portion including a magnet for attracting the center hub which is in a center opening formed in the case, a drive pin to be inserted into a drive hole formed in the center hub, and a flat portion on which the center hub is mounted, with an annular groove formed in the flat portion establishing an outer flat portion and an inner flat portion each having a flat surface. A clamp member is disposed for changing the marginal portion around the center hole in the disk mounted on and supported by the flat surface of the outer flat portion of the annular groove when a disk accommodated in a flexible jacket and having no center hub is used, and is arranged to closely in contact with the flat surface of the outer flat portion around the annular groove and with the side outer portion of the annular groove and the marginal portion around the center hole in the disk.

Since the disk cartridge according to the present invention is structured as described above, an inward deformation of the central portion of the upper case can be corrected by bringing a projection protruded from the inner surface of the case (or a cap attached to the front end portion of the projection) into contact with, for example, an abutting means provided in the rotating member to push back and resist such inward deformation of the upper case. Therefore, contact between the drive pin and the inner surface of the upper case can be prevented. The contact established by the abutting means with the projection on the upper case will not serve as a load upon rotation. In addition, the center hub does not need to be provided with a projection to be abutted to the upper case. Therefore, the inner thickness of the case can be reduced.

Furthermore, since the projection can serve as a member for positioning the disk with respect to the case, the center opening formed in the lower case need not serve as the member for positioning the center hub. Therefore, the diameter of the center opening can be arranged to be larger than that of the center hub. As a result, the spindle, that is, the rotation drive member, having a maximum diameter which is capable of driving a disk without a center hub, can be received within the center opening.

On the other hand, as a result of the thus-formed structure of the disk drive, the disk having a center hub can be rotated by magnetically attracting the center hub by the rotation drive member (spindle member) as well as by the drive pin thereof fitted into the drive hole. Meanwhile, the disk without the center hub can be rotated by holding the disk between the rotating member and the clamp member.

BRIEF DESCRIPTION OF THE DRAWINGS

FIGS. 9A, 9B and 10 relate to a first conventional example, wherein

DETAILED DESCRIPTION OF THE INVENTION

The present invention will now be described with reference to the illustrated embodiment.

Figure 1:
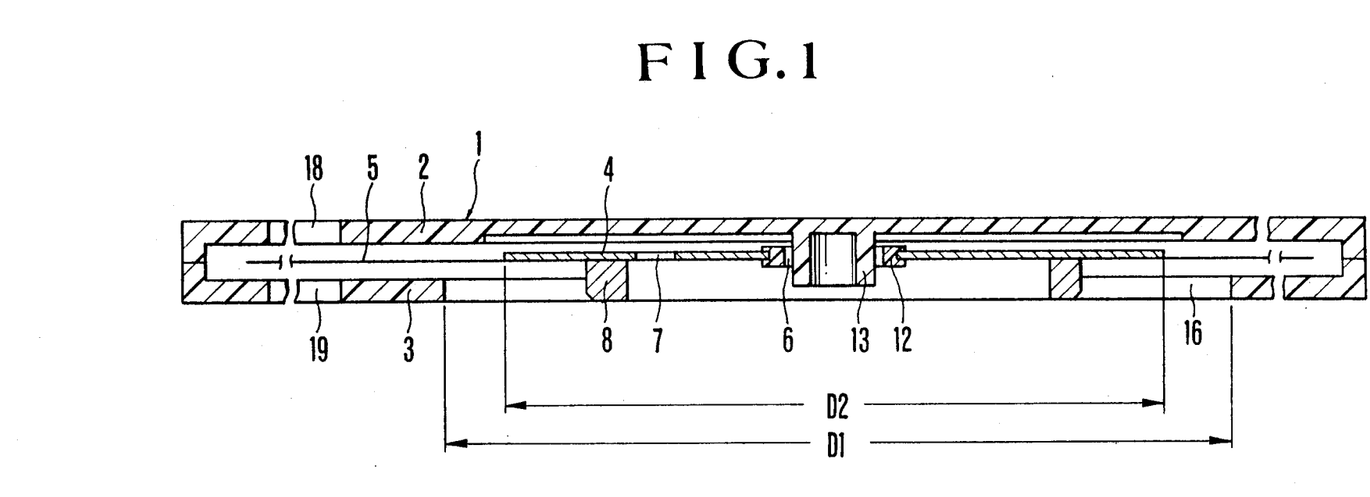
FIG. 1 is a side-elevational cross-sectional view which illustrates an embodiment of a magnetic disk cartridge according to the prevent invention.
Figure 4:
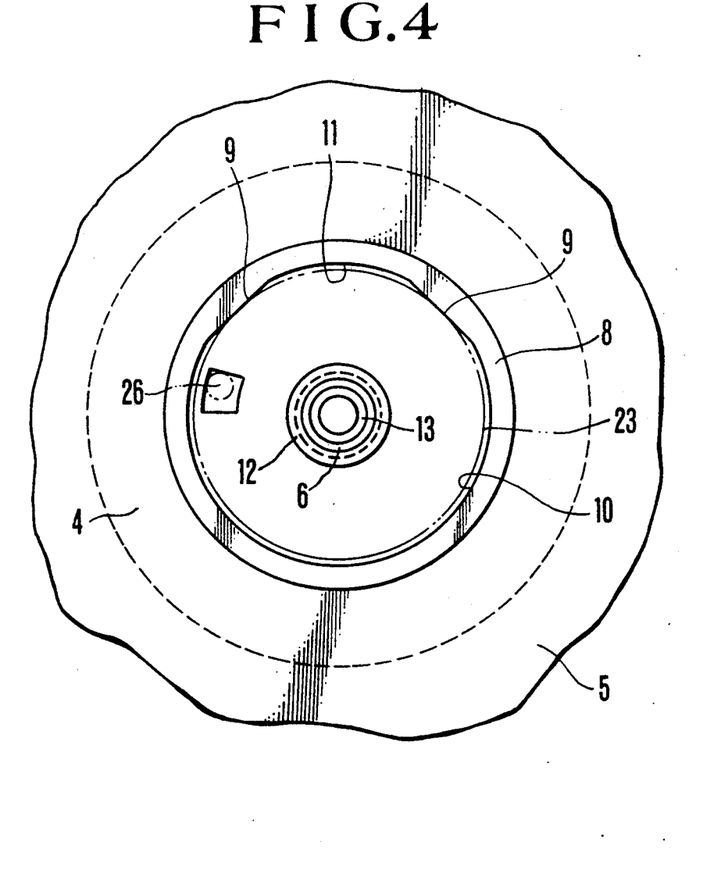
FIG. 4 is an explanatory view which illustrates a rear side of a center hub of the magnetic disk cartridge shown in FIG. 1.

FIG. 1 is a side-elevational view, from which a part is omitted, illustrating a disk cartridge. Reference numeral 1 represents a case assembly made of a relatively hard plastic and structured by integrating an upper case 2 and a lower case 3. This case 1 rotatably accommodates therein a flexible magnetic disk 5 integrated with a metallic center hub 4. This center hub 4 is provided with a center hole 6 and a drive hole 7, and has a rear side thereof to which an annular projection 8 is secured. This annular projection 8 has an inner surface on which a straight portion 9, 9 and circular arc portions 10 and 11 as shown in FIG. 4, are formed. The marginal portion of the center hole 6 in the center hub 4 is covered with an annular protector 12 integrally made of a synthetic resin.

Figure 5:
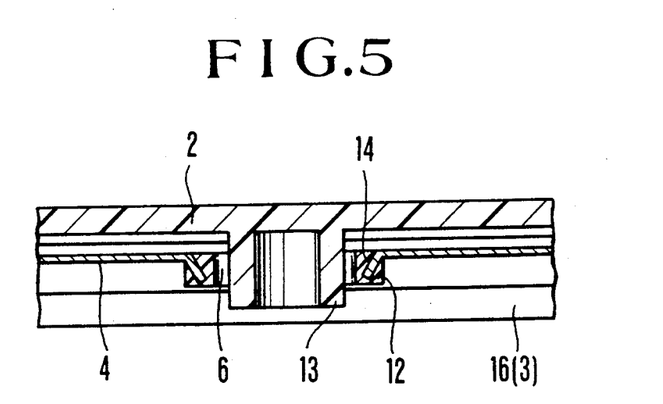
FIG. 5 is a cross-sectional view which illustrates an essential portion of an modified example of a protector.
Figure 6:
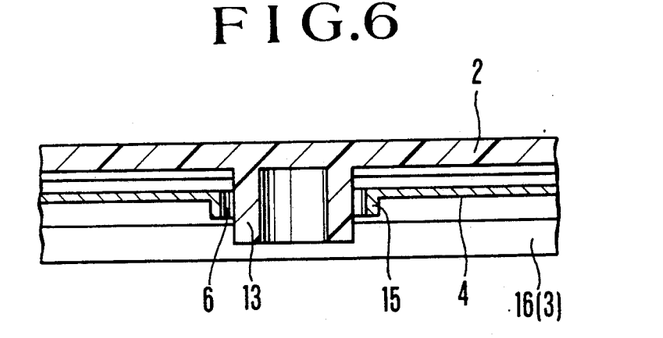
FIG. 6 is a cross-sectional view which illustrates an example of a raised and bent portion of the center hub.

The upper case 2 does not have a center opening, and the central portion of the inner surface thereof is provided with an integrally formed cylindrical projection 13. The projection 13 is inserted into the center hole 6 surrounded by the protector 12 with a certain play or gap, so that the center hub 4 and the magnetic disk 5 can be positioned with respect to the case 1. The protector 12 at the marginal portion of the center hole 6 is provided for the purpose of reducing a damage that might be caused from abrasion or friction between the edge of the center hole 6 and the projection 13. In order to achieve this object, a structure may be employed such that a part of the marginal portion around the center hole 6 in the center hub 4 or the entire portion of the same is, as shown in FIG. 5, arranged to have a raised and bent portion 14 which is bent diagonally, and the protector 12 is secured to this raised and bent portion 14. Alternatively, a structure, as shown in FIG. 6, may be employed in such a manner that a vertically raised (projected) and bent portion 15, perpendicular to the marginal portion of the center hole 6 is formed as shown in FIG. 6, and the inner surface of this raised and bent portion 15 is made to directly confront the projection 13.

Figure 7:
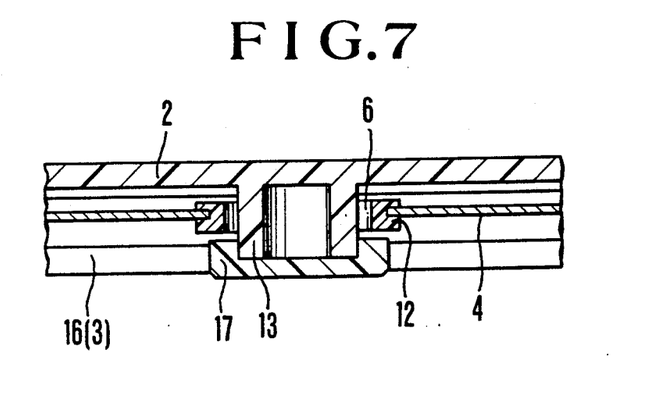
FIG. 7 is a cross-sectional view which illustrates an essential portion of an embodiment of the cartridge having a cap attached to a projection of an upper case.

On the other hand, the lower case 3 is provided with a center opening 16 having diameter D1 which is, according to this embodiment, larger than diameter D2 of the center hub 4. As a result, a relatively large diameter spindle member can be received. Omitting a case where D1 < D2, a stopper cap 17 needs to be, as shown in FIG. 7, secured to the end portion of the projection 13 which freely penetrates through the center hub 4 to prevent an weight of the center hub 4 from excessively deforming the center hub 4 downward as viewed in FIG. 1, causing the magnetic disk 5 to be bent and damaged in the case of D1 > D2.

Referring to FIG. 1, reference numerals 18 and 19 represent head windows which are formed in the corresponding upper case 2 and the lower case 3 at the confronting positions with each other. These head windows 18 and 19 are closed by a shutter (omitted from illustration) when the device is not in use, while the same is arranged to be opened/closed in accordance with the loading/unloading action of the disk cartridge on the disk drive.

Figure 2:
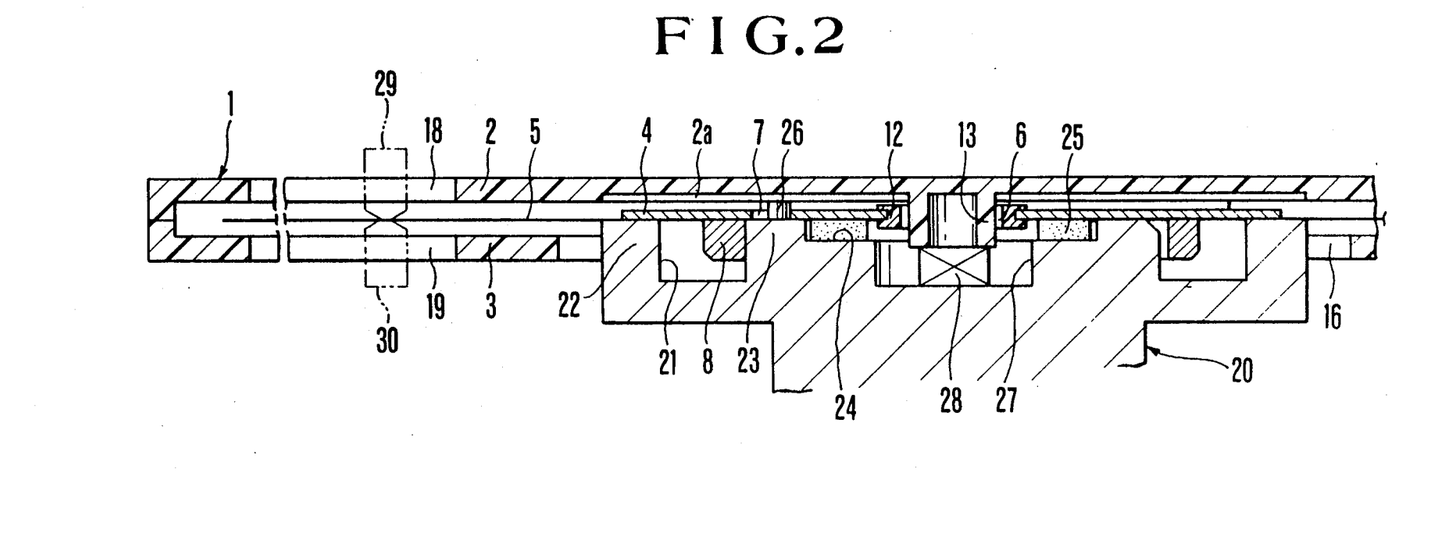
FIG. 2 is a side-elevational cross-sectional view which illustrates an essential portion of a magnetic disk drive in a state where the magnetic disk cartridge shown in FIG. 1 is loaded thereon.

FIG. 2 is a side-elevational cross-sectional view of an essential portion of the disk cartridge loaded on the magnetic disk drive, where this disk drive can selectively drive the magnetic disk accommodated in the thus structured magnetic disk cartridge or the flexible magnetic disk a center hub which is accommodated in a flexible jacket.

Referring to this drawing, reference numeral 20 represents a spindle member serving for rotating the disk, and is made integrally with an output shaft of a spindle motor (omitted from illustration). The upper surface of the spindle member 20 is made flat, and is divided into two parts, that is, an outside inner portion 22 having a flat surface and an inside inner portion 23 having a flat surface (to be respectively abbreviated "outer flat portion 22" and "inner flat portion 23" hereinafter) by an annular groove 21. An annular step 24 is formed in the inner surface of the inner flat portion 23, this annular step 24 being provided with a magnet 25 made of an annular rubber magnet or the like for the purpose of attracting the center hub 4. This magnet 25 is arranged in height to be substantially at the same level as that of the two flat portions 22 and 23. Reference numeral 26 represents a drive pin to be inserted into and engaged with the drive hole 7. The drive pin 26 is secured to the portion of the inner flat portion 23 or to that portion to which the magnet 25 is adhered). The inside portion of this annular step 24 further includes a central concave portion or recess 27 in which an abutting means 28 is provided therein. The abutting means 28 is arranged to be brought into contact, under a proper pressure, with the extended end portion of the projection 13 of the upper case 2 or the cap 17 secured to the extended end portion of the projection 13.

In a case where the magnetic disk cartridge shown in FIG. 1 is used, as shown in FIG. 2, the rear side of the center hub 4 is attracted by the magnet 25, and the drive pin 26 is inserted into and engaged with the drive hole 7 in the center hub 4. Furthermore, the inner flat portion 23 is fitted into the annular projection 8 on the center hub 4. When the center hub 4 is rotated by the drive pin 26, which is arranged to be integrally rotated with the spindle member 20, the straight portion 9 of the annular projection 8 of the center hub 4 is brought into contact with the outer surface of the inner flat portion 23, which is illustrated by an imaginary line in FIG. 4. As a result, the magnetic cartridge can be rotated with the center hub 4 and the magnetic disk 5 positioned correctly. Referring further to FIG. 2, reference numerals 29 and 30 represent an upper magnetic head and a lower magnetic head, respectively. They are arranged to be brought into contact with a part of the magnetic disk 5 allowed to appear through the head windows 18 and 19 so that magnetic information can be read/written. In addition, the heads 29, 30 are arranged to be moved in the radial direction of the disk on a known type of a head cartridge (omitted from illustration).

In this embodiment, the extended or front end portion of the projection 13 of the upper case 2 is, as shown in FIG. 2, arranged to be brought into contact with the abutting means 28. Even if the central portion of the upper case 2 is warped inward, the upper case 2 has a certain allowance for the deformation due to its elasticity. As a result, the abutting means 28 can act to correct the deformation of the upper case 2. Therefore, a predetermined gap can be always be maintained between the inner surface 2a of the upper case 2 and the top portion of the drive pin 26. By virtue of this, the inner thickness of the case 1 can be sufficiently reduced and the device can be smoothly rotated.

Figure 3:
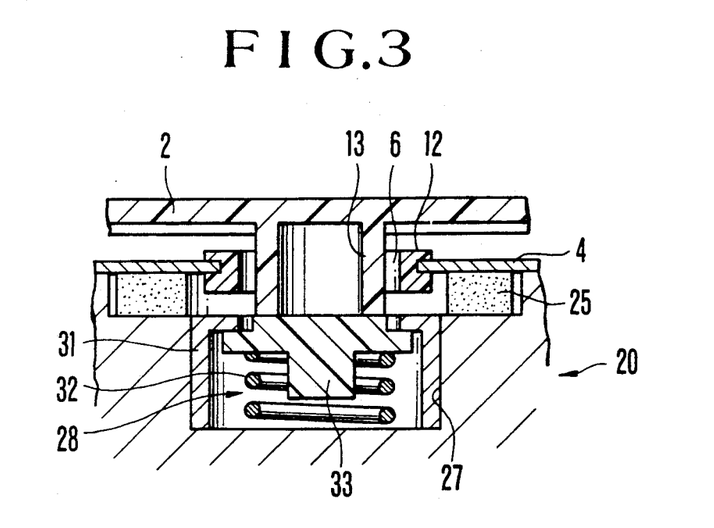
FIG. 3 is a cross-sectional view which illustrates an essential portion of an embodiment of an abutting means of FIG. 2.

FIG. 3 is a view which illustrates an embodiment of the abutting means 28. In a stopper 31 secured to the center concave 27 is provided a raising member 33 which is arranged to be vertically movable and biased upwards by a spring 32. This raising member 33 and the projection 13 are arranged to be brought into contact with each other. As a result of this structure, there is no a fear that an excessive raising force is applied to the projection 13.

Figure 8:
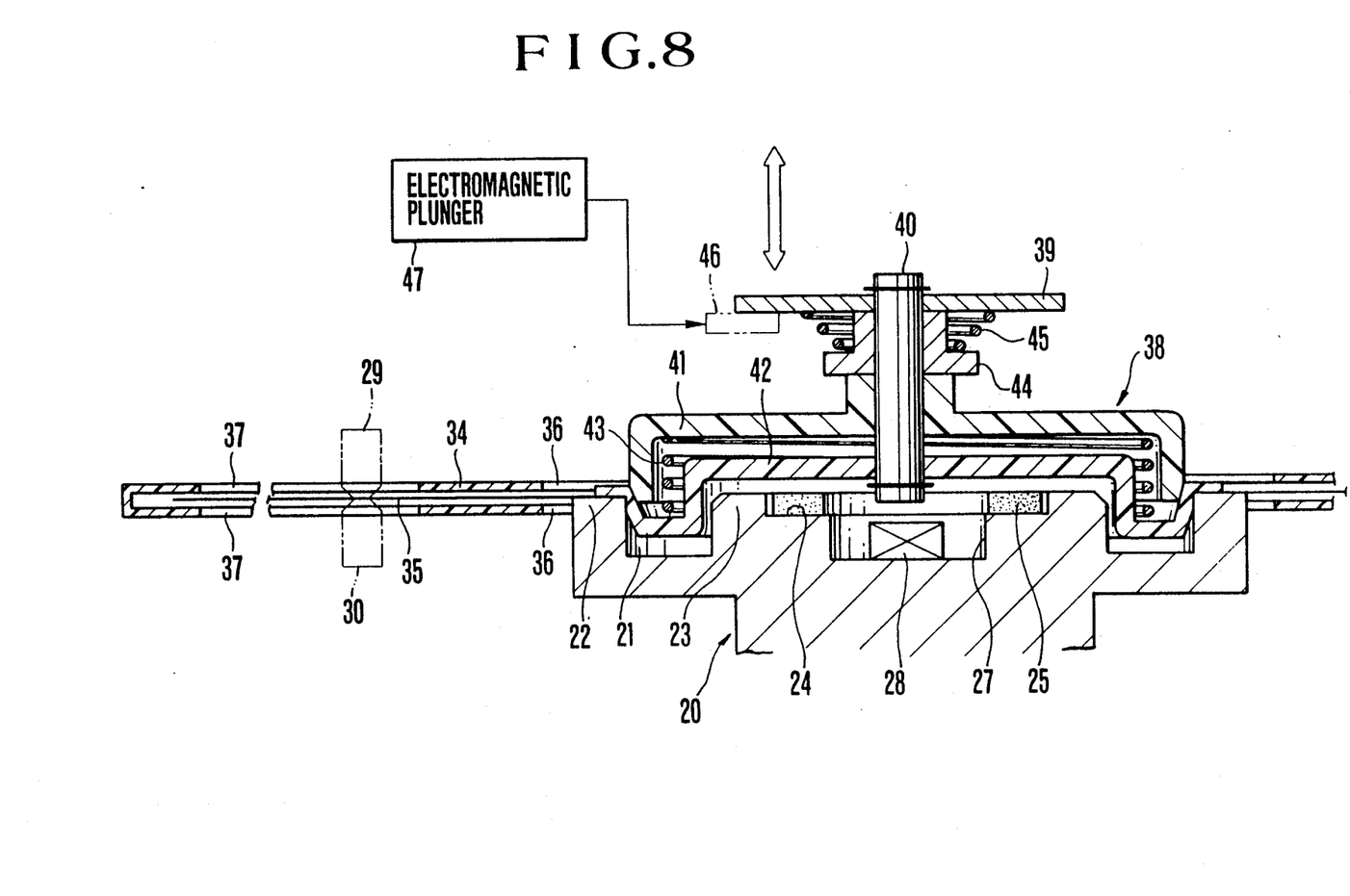
FIG. 8 is a cross-sectional view which illustrates a state where a magnetic disk accommodated in a jacket is loaded on the magnetic disk drive shown in FIG. 2.

FIG. 8 is a side-elevational cross-sectional view illustrating an essential portion of a magnetic disk accommodated in a jacket and loaded on a magnetic disk drive.

Referring to this drawing, reference numeral 34 represents a flexible jacket arranged in such a manner that the same accommodates a known type of a flexible magnetic disk 35 without center hub. The jacket 34 has a center opening 36 in one side thereof and a head window 37 in another side thereof. The magnetic disk 35 is provided with a center hole (omitted from illustration) having a diameter which substantially fits the inner diameter (outer diameter of the groove 21) of the outer flat portion 22 of the spindle 20.

Reference numeral 38 represents a clamp member which acts in cooperation with the spindle member 20 and comprises a support plate 39 vertically movably installed to the main body of the disk drive, a collet 41 and a hub 42. The collet 41 and the hub 42 are rotatably installed to an axle 40 hung from the support plate 39 through a bearing (omitted from the illustration). A spring 43 is disposed between the collet 41 and the hub 42, while another spring 45 is disposed between the support plate 39 and a spring retainer 44 above the collet 41. In the case other than a case in which the jacket 34 is loaded in the device, the clamp member 38 is positioned at a thus-raised and retracted-position against the downward urging force by a spring not shown in FIG. 8 (for example, the clamp member 38 is raised by a lifting plate 46 receiving an upward urging force as illustrated). The collet 41 is arranged according to a known structure in which the expansion force is not applied to the hub 42 in the state above.

On the other hand, when the fact that the jacket 34 has been inserted deeply into the disk drive is detected by an appropriate means (for example, since the corner at the front end portion, along the inserting direction, of the case 1 is formed with a cutoff, while the corner of the jacket 34 is omitted from the cutoff, the presence of the corner of the jacket 34 may be detected by a photosensor or the like), the lifting plate 46 is pushed downward by, for example, an electromagnetic plunger 47 so that the whole body of the clamp member 38 is displaced downward. FIG. 2 illustrates this state. At this time, the marginal portion around the center hole of the magnetic disk 35 has already been disposed on and supported by the outer flat portion 22 of the spindle member 20. As a result, this marginal portion is assuredly held between the outer surface of the hub 42, expanded by the collet 41 and the outer flat portion 22. In addition, a part of the hub 42 is positioned within the annular groove 21 so that the same is positioned into close contact with the upper portion of the outer peripheral portion of the groove 21. When the spindle member 20 is rotated in this state, the magnetic disk 35 is, as known, assuredly rotated by the cooperation between the spindle member 20 and the clamp member 38. After the read/write operations are completed, the electromagnetic plunger 47 is de-energized so that the clamp member 38 is again raised by the lifting plate 46. As a result, the jacket 34 is taken out.

As described above, in the magnetic disk drive according to this embodiment, the magnetic disk 5 having a metallic center hub 4 and accommodated in a disk cartridge or a magnetic disk 35 without any center hub accommodated in the jacket 34 can be selectively chucked and driven. As a result, the utility of the device can be significantly improved.

As described above, a disk cartridge can be provided which is capable of protecting the upper case thereof from the fear that the drive pin or the like might brought into contact therewith it even if the inner thickness of the case is reduced. Furthermore, means to avoid contact between the case and the drive pin does not need to be provided, such means becoming, as known, an excessive load into rotation.

In addition, a disk drive can be provided in which both the disk accommodated in the disk cartridge and the disk accommodated in the jacket can be chucked and rotated. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk cartridge including a case assembly rotatably accommodating therein a magnetic disk including a metallic center hub having a center hole therethrough, said case assembly comprising an upper case without a center opening and a lower case having a center opening therein, said upper case being provided with a projection protruding from a center portion of an inner surface of said upper case beyond a lower surface of said hub through said center hole thereof such that said projection abuts against a spindle member of a disk drive which projects through said center opening of said lower case so as to rotatably support said hub of said magnetic disk.

2. A disk cartridge according to claim 1, wherein a protector member made of synthetic resin is integrally fixed to a marginal portion of said metallic center hub around said center hole thereof.

3. A disk cartridge according to claim 1, wherein a raised and bent portion is formed in a marginal portion of said metallic center hub around said center hole thereof.

4. A disk cartridge according to claim 3, wherein a protector member made of synthetic resin is integrally fixed to said raised and bent portion in said metallic center hub.

5. A disk cartridge according to claim 1, wherein a cap having a diameter larger than that of said center hole in said metallic center hub is attached to that portion of said projection which protrudes beyond said lower surface of said hub.

6. A disk cartridge according to claim 1, wherein said center opening in said lower case has a diameter larger than a diameter of said metallic center hub.

7. A disk drive for rotating a magnetic disk accommodated in a flexible jacket and having no center hub comprising:
a rotatable portion including a flat portion on which said magnetic disk is mounted, said rotatable portion having an annular groove formed in said flat portion;
a drive pin to be inserted into a drive hole formed in said magnetic disk; and
a clamp member disposed such that a marginal portion around a center hole in said magnetic disk is mounted on and supported by an outer flat portion around said annular groove when a disk accommodated in said flexible jacket and having no center hub is used, said clamp member being arranged so as to closely contact said outer flat portion and a side outer portion of said annular groove and said marginal portion around said center hole in 8. In a disk drive for rotating a disk cartridge which rotatably accommodates a magnetic disk having a metallic center hub in a case assembly formed by an upper case without a center opening and a lower case having a center opening, said upper case being provided with a projection protruding from a center portion of an inner surface of said upper case in such a manner as to rotatably support said metallic center hub, a front end portion of said projection extending beyond a lower surface of said hub through a center hole in said metallic center hub, the improvement comprising:
abutting means against which said front end portion of said projection abuts to rotate said magnetic disk.

9. A disk drive for rotating a magnetic disk having a metallic center hub accommodated in a case assembly comprising an upper case and a lower case, said upper case being provided with a projection protruding from a center portion of an inner surface of said upper case, said disk drive comprising:
- a rotatable portion including a magnet for attracting said metallic center hub of said magnetic disk which appears in a center opening formed in said lower case of said case assembly, said rotatable portion including a flat portion on which said metallic center hub is mounted, said flat portion having an annular groove formed therein,
- a drive pin to be inserted into a drive hole formed in said metallic center hub; and
- an abutting means provided in a recessed center of said rotatable portion for abutting against said projection protruding from said center portion of said inner surface of said upper case.

10. A disk cartridge and disk drive assembly comprising:
- a disk cartridge including a case assembly rotatably accommodating therein a magnetic disk including a metallic center hub having a center hole therethrough, said case assembly comprising an upper case without a center opening and a lower case having a center opening therein, said upper case being provided with a projection protruding from a center portion of an inner surface of said upper case beyond a lower surface of said hub through said center hole thereof such that said projection abuts against a spindle member of a disk drive which projects through said center opening of said lower case so a to rotatably support said hub of said magnetic disk; and
- a disk drive for rotating a magnetic disk having a metallic center hub accommodated in a case assembly comprising an upper case and a lower case, said upper case being provided with a projection protruding from a center portion of an inner surface of said upper case said disk drive including: a rotatable portion including a magnet for attracting said metallic center hub of said magnetic disk which appears in a center opening formed in said lower case of said case assembly, said rotatable portion including a flat portion on which said metallic center hub is mounted, said flat portion having an annular groove formed therein, a drive pin to be inserted into a drive hole formed in said metallic center hub; and an abutting means provided in a recessed center of said rotatable portion for abutting against said projection protruding from said center portion of said inner surface of said upper case.

11. A disk cartridge and disk drive assembly comprising:
- a flexible magnetic disk accommodated in a flexible jacket; and
- a disk drive for rotating a magnetic disk accommodated in a flexible jacket and having no center hub including: a rotatable portion including a flat portion on which said magnetic disk is mounted, said rotatable portion having an annular groove formed in said flat portion; a drive pin to be inserted into a drive hole formed in said magnetic disk; and a clamp member disposed such that a marginal portion around a center hole in said magnetic disk is mounted on and supported by an outer flat portion around said annular groove when a disk accommodated in said flexible jacket and when no center hub is used, said clamp member being arranged so as to closely contact said outer flat portion and a side outer portion of said annular groove and said marginal portion around said center hole in said magnetic disk.

* * * * *